United States Patent [19]
Kubo et al.

[11] 3,781,626
[45] Dec. 25, 1973

[54] OPTIMIZED P.I.D. CONTROLLER

[75] Inventors: Moritada Kubo, Tokyo; Yukiharu Takahashi, Yokohama, both of Japan

[73] Assignee: Tokyo Shibaura Electric Company Ltd., Kawasaki-shi, Kanagawa-ken, Japan

[22] Filed: Dec. 30, 1971

[21] Appl. No.: 214,121

[30] Foreign Application Priority Data
Dec. 31, 1970   Japan.............................. 45/123665

[52] U.S. Cl.................. 318/561, 318/609, 318/610
[51] Int. Cl...................... G05b 13/00, G05b 11/42
[58] Field of Search..................... 318/561, 609, 610

[56]            References Cited
               UNITED STATES PATENTS

| | | | |
|---|---|---|---|
| 3,536,978 | 10/1970 | Meredith et al. | 318/561 |
| 2,990,504 | 6/1961 | White | 318/561 |
| 3,105,928 | 10/1963 | Congleton et al. | 318/561 |
| 3,109,970 | 11/1963 | Smyth | 318/561 |
| 3,435,422 | 3/1969 | Gerhardt et al. | 318/561 X |
| 3,448,362 | 6/1969 | Dorf et al. | 318/561 X |

*Primary Examiner*—T. E. Lynch
*Attorney*—Norman F. Oblon et al.

[57]              ABSTRACT

A system is disclosed for optimizing the operation of remote controlled devices or systems which are subject to changing response characteristics, due for example, to widely varying load conditions. The disclosed system includes a testing network for measuring the response of a remote controlled device or system to known inputs. A computing network is provided for generating control coefficients from the outputs of the testing network. The control coefficients generated by the computing network are used to modify the operation of a central control unit in response to the changing characteristics of the remote controlled device. When the remote controlled device returns to its normal, or no load, condition, the disclosed system also reverts to its normal operating parameters.

3 Claims, 17 Drawing Figures

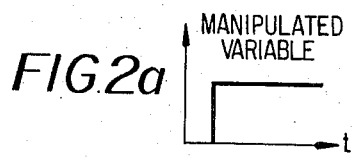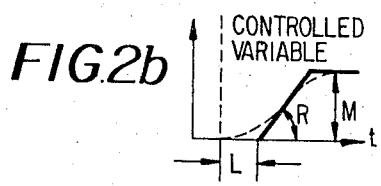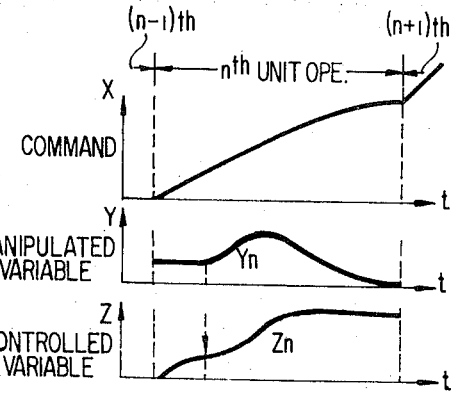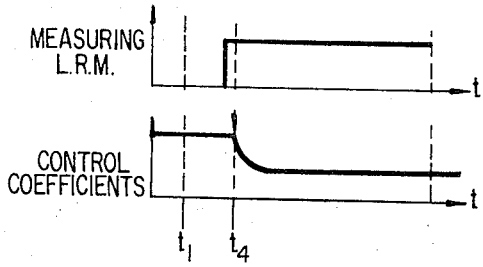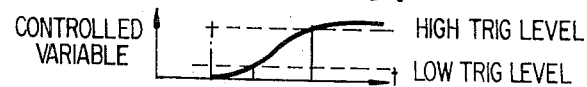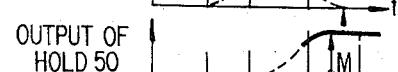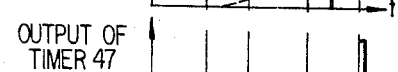

OPTIMIZED P.I.D. CONTROLLER

BACKGROUND OF THE INVENTION

1. Field of the Invention

This invention relates to an automatic control system, and more particularly to an automatic control system which compensates for changes in the response characteristics of the device or system to be controlled.

2. Description Of The Prior Art

In prior art control systems, such, for example, as PID control systems, the control coefficients (proportional gain, integral or reset time, and derivative or rate time) are preset or fixed in response to the normal response characteristics of the device or system to be controlled. However, fixed control coefficients fail to provide accurate control of the regulated device or system when the response characteristics of the regulated device or system change, due, for example, to large variations in loading. The regulated system may, for example, be an elevator or a crane, or a similar system which is subjected to widely varying loads.

SUMMARY OF THE INVENTION

Accordingly, one object of this invention is to provide a control system capable of automatically setting optimum control coefficients corresponding to changes in the response characteristics of a controlled or regulated device or system.

Another object of this invention is to provide a control system capable of automatic changeover from a mode of operation in which optimum control coefficients are generated to a normal mode of operation, and vice versa, thereby providing the most suitable control of a regulated system.

Briefly, these and other objects of this invention are achieved by providing a control system having control coefficients which are adjusted in a coefficient adjusting operation before normal operation for controlling a regulated system according to a manipulated or processed signal developed from an original command signal. The above coefficient adjusting operation is such that the initially preset control coefficients are adjusted according to optimum control coefficients obtained by analysis and computation from a response of the regulated system to a known input.

In the preferred embodiment of this invention, a PID controller is provided to develop a modified signal for actuating a controlled or regulated system from an error signal derived from a comparison of the system output with a command signal. A function generator is provided to generate a unit step signal as the initial input variable for testing the response of the regulated system. A device is provided for detecting the lag time of the system output with respect to the initial input variable. The slope of the system output is measured during its rising interval, and the amplitude of the output resulting from the known input is measured. A computing network is provided to develop the optimum proportional integral time and derivative time to be set into the PID controller. A servo is also provided for adjusting the PID controller according to the output of the computing network. Finally, a sequence controller is provided for changing the operational mode of the system from the control coefficient adjusting mode to a normal operating mode.

One advantage of this invention resides in the provision of a control system having a device for automatically optimizing control coefficients in response to the state of a regulated system. Accordingly, a suitable control operation is obtained for controlling a machine, such as a crane, an elevator, an industrial robot, and the like, which is subjected to widely varying loads.

Another advantageous feature of this invention resides in automatic transfer or changeover between the control coefficient adjusting mode and the normal mode of operation, whereby a most suitable machine control control is achieved without the aid of a human operator.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying Drawings, wherein:

FIGS. 2($a$) and 2($b$) are graphical diagrams illustrating a pair of waveforms of signals which are supplied to the waveform analyzer employed in the embodiment shown in FIG. 1;

FIGS. 4$a$ — 4$e$ are graphical diagrams illustrating waveforms explaining the operation of the embodiment shown in FIG. 1; and, FIGS. 5$a$ — 5$h$ are graphicals diagram illustrating waveforms explaining the operation of the waveform analyzer shown in FIG. 3.

DETAILED DESCRIPTION OF THE PREFERRED EMBODIMENT

Figure 1:
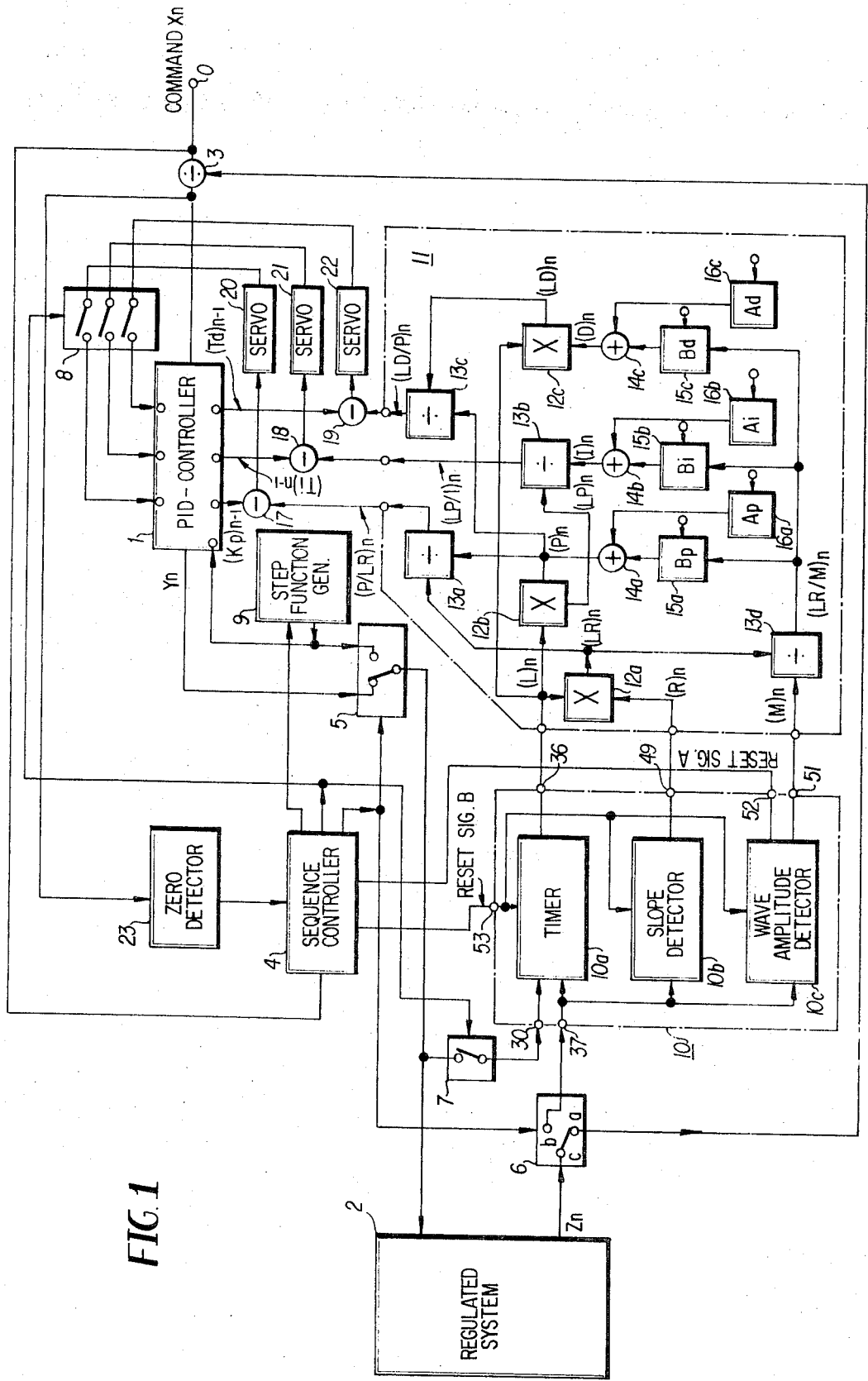
FIG. 1 is a block diagram of one embodiment of the present invention.

Referring now to the Drawings, wherein like reference numerals designate identical or corresponding parts throughout the several views, and more particularly to FIG. 1 thereof, the numeral 1 refers to a PID controller having the following control coefficients:$Kp$, representing proportional gain, $Ti$, representing reset or integral time, and $Td$, representing rate or derivative time. These control coefficients are adjustable externally. The PID controller 1 develops a manipulated variable or output from an input or actuating signal which represents the difference between a reference or command input and a feedback signal from the regulated system. A regulated system 2 is provided, which is controlled according to the manipulated variable output from the PID controller 1. The controlled variable in the regulated system 2 is fed back to a comparator 3, which compares the controlled variable with a reference or command input applied to a terminal 0 in order to generate an error or actuating signal which is applied to the input terminal of the PID controller 1.

Thus, the main control system comprises the PID controller 1, the regulated system 2 and the comparator 3.

An auxiliary control system is provided for appropriately setting or adjusting the control coefficients of the PID controller 1 in response to the state of regulated system 2, as will be explained. Numeral 4 designates a sequence controller which operates when a reference input is applied to terminal 0 to cause relays 5 and 6 to disconnect the terminals $c$ and $a$ and to connect the terminals $c$ and $b$, to cause switches 7 and 8 to close, and to cause a step function generator 9 to operate, thereby starting the adjusting of the control coefficients. The sequence controller 4 also operates when it receives a reset signal A from a waveform analyzer 10 (hereinafter described in detail), to reset the relays 5 and 6, thereby disconnecting the terminal c from the terminal b and connecting the terminal c to the terminal a. This causes the switches 7 and 8 to open, causing the step function generator 9 to halt its operation. Further, the sequence controller 4, after receiving a signal from a zero-detector 23 (hereinafter described in detail), transmits a reset signal B to the waveform analyzer 10 to clear the contents stored therein. The step function generator 9 produces an electric signal of known wave shape, such as a unit step wave, as shown in FIG. 2(a), of relatively small amplitude, which is applied through the terminals b and c of the relay 5 to the regulated system 2 as an initial manipulated variable. The output signal from the generator 9 is also applied to the PID controller 1 to obtain a condition under which the control coefficients thereof are adjustable.

The waveform analyzer 10 includes a time measuring circuit or timer 10a, a slope detector 10b and a wave amplitude or peak detector 10c. When the analyzer 10 receives the initial manipulated variable through the switch 7 and the initial controlled variable in response thereto through the b contact of the relay 6, it detects the time lag L of the initial controlled variable with respect to the initial manipulated variable. It also detects the slope R and wave amplitude M of the initial controlled variable, as shown in FIG. 2(b). The waveform analyzer 10 transmits a reset signal A to the sequence controller 4 after completion of its operation, as will be understood from the detailed description hereinafter set forth.

There is also provided a computing circuit 11 including multipliers 12a, 12b and 12c; dividers 13a, 13b, 13c and 13d; adders 14a, 14b, and 14c; coefficient setters 15a, 15b and 15c; and constant setters 16a, 16b, and 16c. The computing circuit 11 is arranged to develop a proportional gain:

$$(K_p)_n = (P)_n/LR,$$

an integral time:

$$(T_i)_n = (LP)_n/I,$$

and a derivative time:

$$(T_d)_n = (LD)_n/P$$

from the lag time $(L)_n$, the slope $(R)_n$ and the wave amplitude $(M)_n$ which are provided by the waveform analyzer 10. The suffix "n" indicates the above coefficients are of the nth or instant operation. In addition, the following relationships apply:

$$P = K_pRL,$$

$$I = K_pRL\ (L)/T_i, \text{ and}$$

$$D = K_pRL\ (T_d)/L.$$

The coefficient setters 15a, 15b and 15c are preset with the values $B_p$, $B_i$ and $B_d$, respectively, according to desired conditions, such, for example, as shown in Table 1. The constant setters 16a, 16b and 16c are also preset with the values $A_p$, $A_i$ and $A_d$, respectively, according to desired conditions, such, for example, as shown in Table 1.

TABLE I

Constants according to the "Cohen Coon Method"

| Condition to be considered | $P=K_pRL$ $=A_p+B_p(RL/M)$ | $I=K_pRL(L/T_i)$ $=A_i+B_i(RL/M)$ | $D=K_pRL(T_d/L)$ $=A_d+B_d(RL/M)$ |
|---|---|---|---|
| 25% damping | $A_p=1.03$ $B_p=0.35$ | | |
| 25% damping, minimum offset. | $A_p=1.24$ $B_p=0.16$ | | $A_d=0.34$ $B_d=0.11$ |
| 25% damping, minimum control area. | $A_p=0.9$ $B_p=0.083$ | $A_i=0.27$ $B_i=0.6$ | |
| 25% damping, maximum $K_pRL$. | $A_p=1.35$ $B_p=0.25$ | $A_i=0.54$ $B_i=0.33$ | $A_d=0.5$ |

NOTE.—A detailed explanation concerning the "Cohen Coon Method" will be found in "Trans. ASME, Theoretical Consideration of Retarded Control," vol. 75 (1953), No. 5, pp. 827-834, by G.H. Cohen & G.A. Coon.

Comparators 17, 18 and 19 are provided to develop difference signals between $(K_p)_n$, $(T_i)_n$ and $(T_d)_n$ from the computing circuit 11 and $(K_p)_{n-1}$, $(T_i)_{n-1}$, and $(T_d)_{n-1}$, respectively, the latter set of values being in the PID controller 1 as the last or $(n-1)$st coefficients. There are further provided servo devices 20, 21 and 22 which operate in response to the difference outputs from the comparators 17, 18 and 19, respectively, to adjust or compensate the coefficient values from those [i.e., $(K_p)_{n-1}$, $(T_i)_{n-1}$ and $(T_d)_{n-1}$] formerly set in the PID controller 1 to the instant suitable values [i.e., $(K_p)_n$, $(T_i)_n$ and $(T_d)_n$]. In order to detect the completion of the operation of the main control system, the zero detector 23 produces a completion signal which is applied to the sequence controller 4 when the output of the comparator 3 or actuation signal becomes zero.

Figure 3:
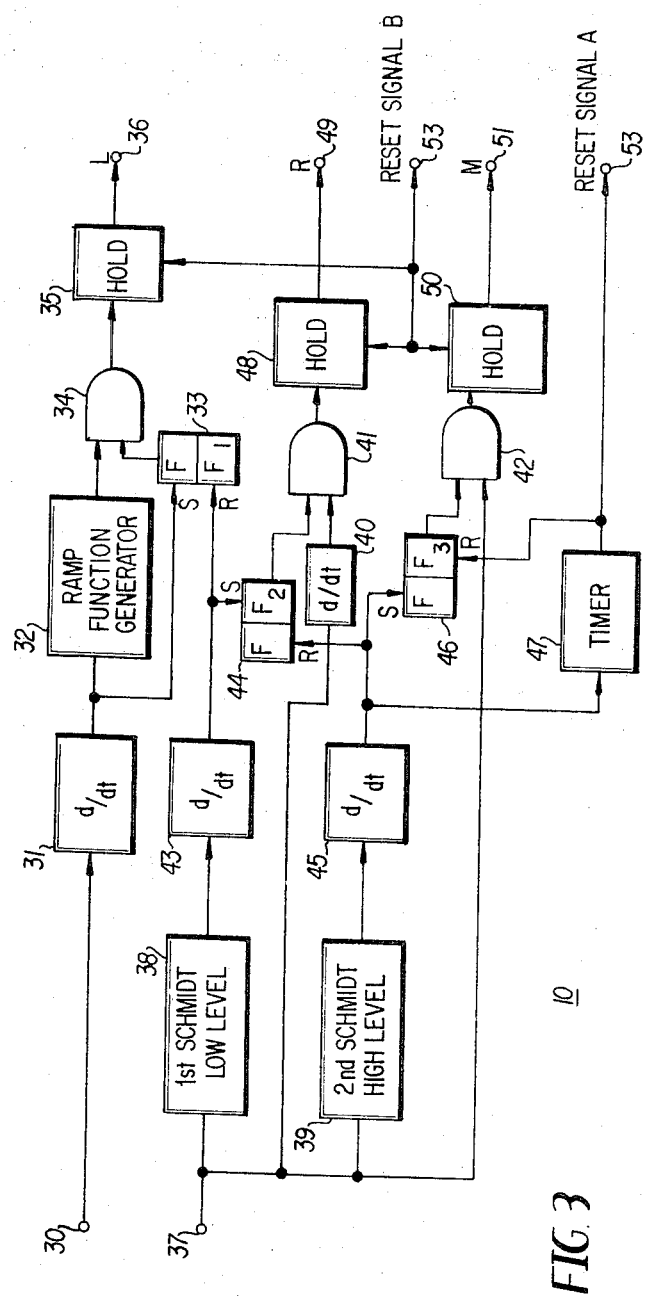
FIG. 3 is a detailed block diagram of the waveform analyzer employed in the embodiment shown in FIG. 1.

Referring now to FIG. 3, one embodiment of the waveform analyzer 10 is illustrated in more detail. The initial manipulated variable generated by the step function generator 9 is applied through a terminal 30 to a differentiation and wave shaping circuit 31. The output of the circuit 31 is applied to the input terminal of a ramp function or a saw-tooth wave generator 32, and to the set terminal of a first flip-flop circuit 33. The saw-tooth wave generator 32, upon receiving the output from circuit 31, operates and produces a saw-tooth wave signal at its output terminal. An AND gate 34 is provided, having a pair of input terminals, one of which is connected to the output terminal of the sawtooth wave generator 32, and the other to the output terminal of the flip-flop circuit 33. Thus, the saw-tooth wave signal from the saw-tooth wave generator 32 may pass through the AND-gate 34 when the flip-flop circuit 33 is in its set state. Connected to the output terminal of the AND gate 34 is a wave amplitude or peak holding device 35, which is adapted to hold the maximum value of the output signal from the AND gate 34 and to transmit this maximum value to a terminal 36.

Applied to a terminal 37 is an initial output or controlled variable from the regulated system 2 which represents the response of the regulated system to the initial manipulated variable generated by the step function generator 9. The initial controlled variable on terminal 37 is then applied to the input terminals of first and second Schmidt trigger circuits 38 and 39, respectively, and to one input terminal of an AND gate 41 through a differentiating circuit 40, and also to one input terminal of an AND gate 42. The first Schmidt trigger circuit 38 has a relatively low trigger level, and the second Schmidt trigger circuit 39 has a relatively high trigger level. The output signal of the first Schmidt circuit 38 is applied to a differentiating and wave shaping circuit 43, the output signal of which is in turn conducted to the reset input terminal of the flip-flop circuit 33, and also to a set input terminal of a flip-flop circuit 44. The output of the second Schmidt trigger circuit 39 is applied to another differentiating and wave shaping circuit 45. The output signal therefrom is conducted to the reset input terminal of the second flip-flop circuit 44, to a set input terminal of a third flip-flop circuit 46, and to an input of a timer circuit 47. The timer 47 is constructed such that when it receives the signal from the differentiating and wave shaping circuit 45, the timer 47 starts its operation, and supplies a reset pulse to both the reset terminal of the flip-flop 46 and to an output terminal 52, providing a reset signal A after a prescribed time interval. The output terminal of the second flip-flop 44 is connected to the other input terminal of the AND gate 41. Similarly, the output terminal of the third flip-flop 46 is connected to the other input terminal of the third AND gate 42. Connected to the output of the AND gate 41 is a wave amplitude or peak holding device 48, which holds the maximum value of the output signal from the AND gate 41 and transmits this maximum value to a terminal 49. Similarly, the output of the AND gate 42 is also connected to a wave amplitude or peak holding device 50 which holds the maximum value of the output of the AND gate 42 and transmits this maximum value to a terminal 51. A reset signal B is supplied from the sequence controller 4 to the terminal 53 to clear the contents of the wave amplitude holding devices 35, 48 and 50.

Operation of the above embodiment will now be explained with reference to FIGS. 4 and 5. The command or reference signal $X_n$, as shown in FIG. 4(a), is supplied to the terminal 0 and is transmitted to the sequence controller 4, causing the same to operate. This causes thr relays 5 and 6 to change their state from the a terminal side to the b terminal side. The switches 7 and 8 are actuated to their closed condition, and the step function generator 9 starts its operation. The signal of predetermined waveform generated by the step function generator 9 [as shown by the waveform during the interval $t_1$ to $t_4$ in FIG. 4(b) and by the waveform of FIG. 5(a)] is applied to the PID controller 1 as well as to the regulated system 2 and to the time measuring circuit 10a of the waveform analyzer 10.

Thus, the PID controller 1 assumes a state in which its control coefficients can be compensated, and the waveform anaylzer 10 starts its operation.

The operation of the waveform analyzer is as follows.

The initial manipulated variable is supplied to the input terminal 30 of the waveform analyzer 10. A controlled variable is conducted through the relay 6 to the terminal 37, as shown by the waveform during the interval $t_1$ to $t_4$ in FIG. 4(c) and in FIG. 5(b). The signal is then fed back from the regulated system 2 with respect to the initial and manipulated variable applied thereto, as shown by the waveform during the interval $t_1$ to $t_4$ of FIG. 4(b) and in FIG. 5(a). The initial manipulated variable applied to the terminal 30 is treated in the differentiating and wave shaping circuit 31 and further supplied both to the saw-tooth wave generator 32 and to the set input terminal of the first flip-flop circuit 33. Then the flip-flop circuit 33 is set, whereby the AND gate 34 permits the output signal (shown in FIG. 5(e) by a dotted line) from the saw-tooth wave generator 32 to reach the wave amplitude holding device 35. Appearing at the terminal 36 between times $t_1$ and $t_2$ is a saw-tooth wave of gradually increasing amplitude such as shown in FIG. 5(e) by the continuous line.

The first Schmidt trigger circuit 38 operates to produce an output as shown in FIG. 5(c) at an instant $t_2$, at which the amplitude of the initial controlled variable conducted through the terminal 37 reaches the low triggering level of the Schmidt trigger circuit 38. The output signal of the Schmidt trigger circuit 38 is processed by the differentiating and wave shaping circuit 43, and further applied both to the reset input terminal of the first flip-flop circuit 33 and to the set terminal of the second flip-flop circuit 44, thereby resetting the first flip-flop and setting the second flip-flop. The resetting of the first flip-flop 33 inhibits the passing of the output signal of the saw-tooth wave generator 32 through the AND gate 34 to the wave amplitude holding device 35. The output signal of the holding device 35 at $t_2$ is fixed, whereby the signal appearing at the terminal 36 maintains a value equal to that at $t_2$.

It will be understood that the amplitude of the output signal of holding device 35 after a time $t_2$ indicates the lag time L, as seen in FIG. 5(e).

Setting of the second flip-flop 44 at $t_2$ permits passing of the controlled variable processed by the differentiating circuit 40 through the AND gate 41 to the wave amplitude holding device 48. This controlled variable (i.e., the output of differentiating circuit 40) is a curve having its peak at a point where the time derivative of the initial controlled variable reaches its maximum, as shown in FIG. 5(f) by a dotted line. Thus we obtain, at the output terminal 49 of the amplitude holding device 48, a signal as shown in FIG. 5(f) by a continuous line, of which at least the portion after time $t_3$ is equal to the maximum value of the differentiated signal. It will be understood that the maximum value of the derivative of the initial controlled variable (i.e., the output of the holding device 48) is the slope R to be detected.

The second Schmidt trigger circuit 39 generates an output at the output terminal, as shown in FIG. 5(d) at time $t_3$, at which the amplitude of the initial controlled variable reaches the relatively high triggering level of the second Schmidt trigger circuit 39. Then, the output of the Schmidt trigger circuit 39 is processed by the differentiating and wave shaping circuit 45, and is applied both to the second and third flip-flop circuits 44 and 46 to respectively reset and set them, and is further applied to the timer 47 to start its operation.

The AND gate 41 inhibits passing of the output signal of the differentiating circuit 40 due to the resetting of the second flip-flop circuit 44. Hence, the wave amplitude holding device 48 maintains the maximum output between times $t_3$ and $t_4$. The opening of the AND gate 42 due to the setting of the third flip-flop circuit 46 permits passing of the initial controlled variable to the wave amplitude holding device 50. Thus, we obtain an output signal at terminal 51 such as shown in FIG. 5(g). Note that the output of the holding device 50 corresponds to the wave amplitude M to be detected.

Accordingly, signals as shown in FIGS. 5(e), 5(f) and 5(g) appear at the terminals 36, 49 and 51 of the waveform analyzer 10, respectively. These signals represent the lag time $(L)_n$, the slope $(R)_n$ and wave amplitude $(M)_n$, respectively, obtained through analysis of the controlled variable, as shown in FIG. 2(b) by a dotted line, in response to the initial manipulated variable as shown in FIG. 2(a). These signals are fed to the computing circuit 11.

The operation of the computing circuit 11 is as follows. The lag time $(L)_n$ from the terminal 36 is multiplied by the slope $(R)_n$ from the terminal 49 by means of the multiplier 12a, and we obtain $(LR)_n$ which is divided by the amplitude $(M)_n$ from the terminal 51 by means of the divider 13d. The output $(LR)_n/M$ of the divider 13d is multiplied by $B_p$, $B_i$ and $B_d$ by means of the coefficient setters 15a, 15b and 15c, respectively, and then added in the adders 14a, 14b and 14c to $A_p$, $A_i$ and $A_d$ from the constant setters 16a, 16b and 16c, respectively. Thus, we obtain:

$$A_p + B_p(LR)_n/M = (P)_n,$$

$$A_i + B_i(LR)_n/M = (I)_n,$$

and $$A_d + B_d(LR)_n/M = (D)_n.$$

The divider 13a divides $(P)_n$, obtained from the adder 14a, by $(LR)_n$, obtained from the multiplier 12a, and we have:

$$(P)_n/LR = (K_p)_n$$

which is applied to the comparator 17. The output $(LP)_n$ of the multiplier 12b, which multiplies $(L)_n$, obtained from the terminal 36, by $(P)_n$, obtained from the adder 14a, is divided by $(I)_n$, obtained from the adder 14b by means of the divider 13b. We then have:

$$(LP)_n/I = (T_i)_n$$

which is applied to the comparator 18. The multiplier 12c multiplies $(D)_n$, obtained from the adder 14c by $(L)_n$, obtained from the terminal 36, and we obtain $(LD)_n$, which is further divided by $(P)_n$, obtained from the adder 14a by means of the divider 13c, thereby yielding:

$$(LD)_n/P = (T_d)_n.$$

This $(T_d)_n$ is then applied to the comparator 19.

Thus, outputs of the computing circuit 11 are applied to input terminals of each of the comparators 17, 18 and 19, and are compared with the control coefficients $(K_p)_{n-1}$, $(T_i)_{n-1}$, and $(T_d)_{n-1}$, respectively. The error signals thus derived are applied to the servo devices 20, 21 and 22. Each of the outputs of these servo devices acts through the switch 8 to modify the control coefficients of the PID controller 1, to optimize the state of the regulated system 2.

After completion of these operations, the timer 47 (shown in FIG. 3) generates its output at $t_4$ providing a reset signal A, as shown in FIG. 5(h), which actuates the third flip-flop circuit 46 to reset it and to thereby inhibit inputs to the holding device 50. The reset signal A is also transmitted to the sequence controller 4. The sequence controller 4 causes the step function generator 9 to stop its operation, which causes the relays 5 and 6 to change their state from the b terminal to the a terminal, and further causes the switches 7 and 8 to open. The PID controller 1 then has the new control coefficients $(K_p)_n$, $(T_i)_n$ and $(T_d)_n$, modified from the former coefficients $(K_p)_{n-1}$, $(T_i)_{n-1}$ and $(T_d)_{n-1}$ after the time $t_4$, as shown in FIG. 4(e).

After these operations, PID controller 1 starts operating in its normal manner under the newly set control coefficients to develop a manipulated variable $Y_n$ from the reference or command signal $X_n$, and the controlled variable $Z_n$.

When the controlled variable $Z_n$ coincides with the reference $X_n$, the zero detector 23 detects that the output of the comparator 3 is zero, and supplies a halt signal to the sequence controller 4, to generate a reset signal B therefrom. This reset signal is applied to the time measuring circuit 10a, the slope detector 10b, and the wave amplitude detection circuit 10c [which corresponds to the wave amplitude holding devices 35, 48 and 50 in FIG. 3] of the waveform analyzer 10, thereby clearing the contents stored therein.

The above described operations are repeated every time a new reference is set and/or every time the regulated system 2 changes state.

According to this invention, the PID controller is provided with optimum control coefficients automatically. As a result, the control system performs automatically in response to the state of the regulated system, which may be an elevator, or a crane, or some similar device which is subjected to widely varying loads.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by letters patent of the United States is:

1. A network for optimizing the performance of a system according to a predetermined command signal comprising:

comparator means for generating a control signal in response to a comparison of said command signal with a controlled variable signal;

control means responsive to said control signal for developing a manipulated variable signal to actuate said system, said control means having stored therein preset control coefficients which represent a proportional gain $(K_p)n$, an integral time $(T_i)n$, and a derivative time $(Td)n$ which characterize the operation of said system;

function generator means for generating an initial manipulated variable signal that is fed to said system to test the response thereof;

analyzing means for receiving said initial manipulated variable signal from said function generator means and an initial controlled variable signal from said system, said initial controlled variable signal representing the response of said system to said initial manipulated variable signal, said analyzing means including means for detecting the lag time L between a predetermined level of said initial controlled variable signal and said initial manipulated variable signal, means for detecting a slope R of said initial controlled variable signal, and means for detecting an amplitude M of said initial controlled variable signal;

computing means for developing optimal control coefficients in response to the outputs of said analyzing means;

comparison means for comparing said optimal control coefficients with said preset control coefficients and for generating correction outputs in response thereto;

servo means for adjusting said preset control coefficients in response to said correction outputs; and, sequencing means for changing the mode of operation of said network.

2. A network for optimizing the performance of a system controlled by a command signal as in claim 1, wherein:

said function generator means is a unit step function generator.

3. A network for optimizing the performance of a system controlled by a command signal as in claim 1, wherein:

said computing means generates proportional gain P/LR, integral time LP/I and derivative time LD/P, where:

$$P = A_p + B_p(RL)/M$$

$$I = A_i + B_i(RL)/M$$

$$D = A_d + B_d(RL)/M$$

and $A_p$, $A_i$, $A_d$, $B_p$, $B_i$, and $B_d$ are given constants.

* * * * *